United States Patent [19]
Grimm et al.

[11] 3,919,706
[45] Nov. 11, 1975

[54] DIGITAL VOR BEARING CONVERTER WITH TIME AVERAGING

[75] Inventors: Donald K. Grimm, Marion; Floyd M. Totten, Cedar Rapids, both of Iowa

[73] Assignee: Rockwell International Corporation, El Segundo, Calif.

[22] Filed: Oct. 24, 1973

[21] Appl. No.: 409,114

[52] U.S. Cl.......... 340/347 AD; 328/134; 324/83 D
[51] Int. Cl.² ........................................ H03K 13/20
[58] Field of Search .............. 340/340 SY, 347 AD; 328/133, 134; 324/83 D

[56] References Cited
UNITED STATES PATENTS

| | | | |
|---|---|---|---|
| 3,588,734 | 6/1971 | Welti | 331/12 |
| 3,599,102 | 8/1971 | Mous | 328/133 |
| 3,663,956 | 5/1972 | Purdy et al. | 324/83 D |
| 3,683,285 | 8/1972 | Wild | 328/133 |
| 3,760,270 | 9/1973 | Irvin | 324/83 D |
| 3,764,903 | 10/1973 | Griswold | 324/83 D |
| 3,766,545 | 10/1973 | Hikosaka | 340/347 SY |

*Primary Examiner*—Malcolm A. Morrison
*Assistant Examiner*—Vincent J. Sunderdick
*Attorney, Agent, or Firm*—Richard W. Anderson; Robert J. Crawford

[57] ABSTRACT

A means for obtaining a digital readout of the phase displacement between reference and variable phase analog signals employing time-averaging of the data as strobed to an output utilization means. Operational modes keyed to quadrant locations of phase difference vectors maintain the integrity of the output. Each strobed output respresents the time averaging of a plurality of sequential phase measurements.

17 Claims, 11 Drawing Figures

DIGITAL VOR BEARING CONVERTER WITH TIME AVERAGING

This invention relates generally to the conversion of analog information to digital information and more particularly to a means providing a binary readout of VOR bearing information available in analog form as the phase difference between reference and variable phase input signals.

The readout and display of either bearing to or bearing from a VHF omnirange (VOR) ground navigation station from a receiver location has long been accomplished by electromechanical servo positioning means which respond to the phase difference between the 30-Hz reference and 30-Hz variable phase signals recovered by the receiver to produce an output shaft rotation which may drive a pointer to directly indicate the bearing to or from the ground transmission station.

With the advent of digital circuitry, and more particularly with expanded usage of VOR bearing information by binary computers, means have been employed in the art to convert the bearing information carried by the phase difference between the reference and variable VOR signals to digital outputs which correspond to the bearing in either straight binary or binary coded decimal form. Indicators available in the art respond to binary outputs to visually display the bearing in decimal format to the observer.

A basic means of providing a digital output corresponding to bearing information carried by coherent frequency phase displaced input signals is to utilize a particular zero cross-over of the reference (fixed) phase signal to start a clock defined count in a register and to utilize the zero cross-over of the variable phase signal or its complement to stop the count. With proper scaling, the binary counter may then provide a digital readout which is a direct indication of the actual bearing from or bearing to the ground station which is defined by the phase displacement between the reference and variable input signals.

Basic digital conversion circuitries of this type are vulnerable as concerns consistency of readout to jitter and noise appearing on the input analog signals, and may produce output bearing indications in digital form which on the average are accurate but on an individual readout basis may vary as much as ±15° from the true VOR bearing information carried by the input signal.

Accordingly, the object of the present invention is the provision of an improved digital VOR bearing converter circuitry employing means to effect a time averaging of successive readout information sequences such that the output information subsequently displayed comprises the average of a predetermined number of repeated bearing determinations.

The present invention is featured in the provision of a digital bearing conversion circuitry including means for time averaging, wherein digital bearing readouts are consistently referenced to the same revolution of the reference vector, thus obviating inaccuracies which might stem from merely time averaging a plurality of successive readouts.

The present invention is further featured in the provision of a unique counter prescaling feature which, under control of logic circuitry defining discrete operational modes, respectively subject to and not subject to a readout ambiguity, assures that the output bearing determination is made on the basis of the same revolution of the input reference vector.

These and other features and objects of the present invention will become apparent upon reading the following description with reference to the accompanying drawings in which:

The circuitry to be described might be termed a VOR radial readout converter and comprises digital circuitry which measures the phase difference between (in the embodiment) a 30-Hz reference square wave and a variable phase square wave of the same frequency to produce a BCD output which is the whole angle value of this phase difference in degrees.

The purpose of the device as described is to provide a digital readout of bearing to or bearing from a VOR navigation station using signals (reference and variable) received from that station. As above stated, the basic method of phase angle measurement in the system is to start a clock counting into a register at the fall of the reference waveform and to stop the clock at the fall of the variable waveform, the register or counter being scaled and designed in such a way that its most significant content reads directly in BCD degrees of phase angle difference at the end of the count.

In a device of this general type which was caused to be constructed, output readings were, due to noise and jitter and weak input signals, somewhat inconsistent, but on the average provided a valid indication of the actual bearing.

Thus, in accordance with the particular embodiment to be described, 15 phase angle difference samples from 15 consecutive cycles of the 30-Hz input signals are averaged while a sixteenth cycle of the 30-Hz input signals is utilized for reset and reinitialization of the circuitry, whereupon the operation repeats.

The basic method of averaging to be described employs the rescaling of the counter to count one-fifteenth of the phase angle difference per cycle of 30-Hz input signal and permits 15 consecutive samples to gate clock pulses into this rescaled binary counter. Total accumulated count at the end of 15 cycles will then constitute a time average of the bearing angle as measured fifteen consecutive times, since the average of $N$ values is, by definition the summation of $1/N$th of each of the values, i.e., $$\frac{a+b+c+d}{4} = \frac{a}{4} + \frac{b}{4} + \frac{c}{4} + \frac{d}{4}.$$

However, this general averaging method will provide erroneous output information should any one or some of the samples be referenced to a different revolution of the reference vector than others. For example, a number of samples reading 350+° averaged with an equal number of samples reading 0+° (corresponding to readings referenced to different revolutions of the reference vector) would incorrectly average to some value in the vicinity of 180°.

In accordance with the present invention this averaging problem is resolved by the inclusion of a novel decision circuitry which isolates the problem to one of two possible count modes. Mode 1 is defined by phase angle differences between the input reference and variable waveforms from approximately 90° through approximately 270°, where no ambiguity exists, and count mode 2 is established by phase angle difference of approximately 270° through 360° and 0° through approximately 90°.

As will be described, under the circumtances of a mode 2 decision, where the phase angle difference vector falls within the quadrants defined by 270°-360° and 0°-90°, the mode of operation of the circuitry is altered in two ways. An initial value of 180° is entered into the counter before counting begins and the complement of the variable 30-Hz input signal is employed for count stop purposes in place of the direct input. As will be further evident, in mode 2 operation, the amount of count accumulated by the register over 15 samples, since the clock is stopped 180° sooner than it would be in mode 1 operation and proportionally less count is accumulated over the 15 samples, may be defined as follows. Count accumulation over 15 samples will range between 90° (for 270° actual phase difference) through 180° (for 360° = 0° actual phase difference) to 270° (for 90° actual phase difference). Thus, the accumulated count plus the initial 180° count set into the counter will total 270° for 270° actual, 360° for 0° actual, and 450° for 90° actual phase angle difference. The counting register in the converter is designed such that a total count accumulation of 360° will effect an immediate reset to 0° before the next clock pulse occurs. The effect of this operation is to substract 360° from the counter reading for angular counts which exceed one revolution, so that the answer is always less than 360°. The above described mode 2 count accumulation might then generally be tabulated as follows:

| Actual Phase Difference | Accumulated Count | Preset Count | Total Accumulated Count |
|---|---|---|---|
| 270° | 90° | 180° | 270° |
| ↓ | ↓ | | ↓ |
| 360° | 180° | 180° | 360° (reset to 000) |
| ↓ | ↓ | | ↓ |
| 90° | 270° | 180° | 450° → 90° |

Figure 1:
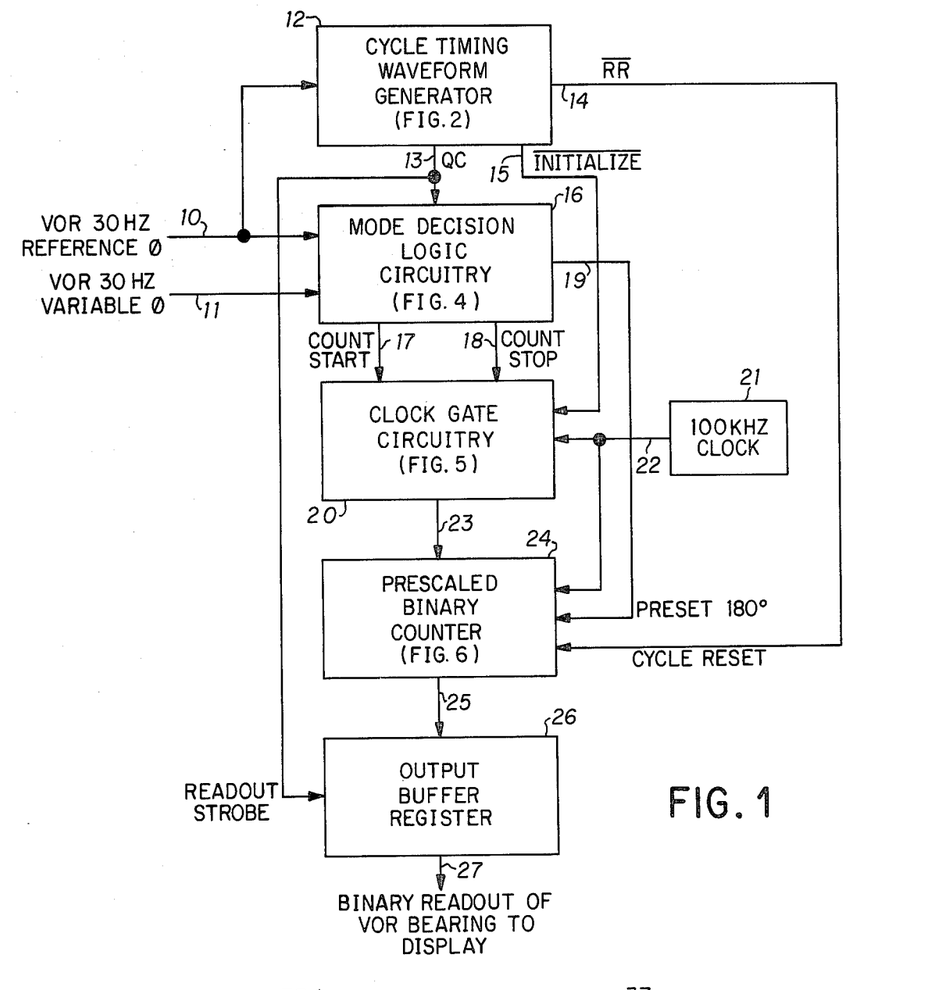
FIG. 1 is a basic generalized block diagram of a particular embodiment of the present invention.

FIG. 1 is a generalized block diagram of the bearing readout converter of the present invention. VOR 30-Hz reference signal 10 and 30Hz variable signal 11 comprise inputs conventionally developed in VOR receivers. The phase difference between these two signals is indicative of the VOR bearing. The general purpose of the conversion circuitry is to convert this analog phase difference into a binary readout of VOR bearing which may be applied for display purposes or alternatively be supplied to computers directly utilizing VOR bearing in digital format. The VOR 30-Hz reference input 10 is applied to a cycle timing waveform generator 12 which generates timing waveforms for the count sequence of the converter. As will be described, waveform generator 12 generates signals which define a predetermined number of repetitive count sequences to be averaged. For convenience, in the embodiment herein described, 16 cycles of the VOR 30-Hz reference input signal 10 define a complete operational sequence. Fifteen of theses cycles are utilized to accumulate count samples into a prescaled binary counter 24, while the sixteenth pulse provides an initialization period during which readout of a previously accumulated count is effected, reset of the counter to ready the system for subsequent count sequence is effected and a decision is made as to the operational mode which will determine the ensuing accumulation so as to assure that all accumulated counts are referenced to the same revolution of the reference phase input vector.

As depicted in FIG. 1, waveform generator 12 develops a counter reset output 14 (designatd $\overline{RR}$) for application to a binary counter 24 Generator 12 develops a readout strobe 13 for application to an output buffer register 26 from which the binary readout 27 is obtainable. Generator 12 further generates an initialization pulse 15 (designated $\overline{INITIALIZE}$) for application to clock gate circuitry 20. As will be described, mode decision logic circuitry 16, in response to the VOR reference and variable input signals 10 and 11 and the strobe output 13 from generator 12, generates count start and stop pulse 17 and 18 for application to clock gate 20 along with a counter preset logic output 19 to the counter 24.

Clock gate circuitry 20 of FIG. 1, as will further be described, responds to count start and count stop pulses 17 and 18 to generate a gating waveform through which clock pulses 22 from 100K Hz clock 21 are passed as an input 23 to the binary counter 24. The count start pulses 17 correspond to successive zero cross-overs of the 30-Hz reference input waveform 10, while the count stop pulses 18 correspond to successive zero cross-overs of either the 30-Hz variable phase input signal, or the complement of this signal, depending upon which of two operational mode decisions has been made by mode decision logic circuitry 16 (or upon whether bearing TO or bearing FROM is being determined should, as will be further described, selective inversion of one of the input signals be employed for obtaining a reciprocal bearing readout). The $\overline{INITIALIZE}$ pulse 15 from waveform generator 12 inhibits the clock gate circuitry 20 during the initialization cycle only such that clock pulses in accordance with the width of the clock gate may be accumulated in the counter 24 only during the 15 sample periods of the complete operational cycle.

Prescaled binary counter 24 of FIG. 1 may comprise a BCD binary counter in which the gated clock pulses 23 are accumulated. The preset input 19 to counter 24 conditions the counter to be reset at the end of an operational sequence on either 0° or 180°, depending upon a prior operational mode determined by mode decision logic circuitry 16. The clock input 22, as applied to binary counter 24, will be further described as being applied to a logic circuit which effects an unconditional reset of the counter 24 to 000 upon a count of 360 being accumulated therein.

In the particular embodiment to be described the count accumulated in counter 24 corresponds to the whole angle value of the phase difference in degrees between the 30 cycle reference and variable input signals 10 and 11. The output 25 from the counter is strobed to an output buffer register 26 in response to a timing pulse 13 from the cycle timing waveform generator 12. The output readout 27 is continuously available for digital display or other utilization.

The operational sequence of the bearing converter of FIG. 1 may best be comprehended from a consideration of specific embodiments of the functional blocks of FIG. 1.

Figure 2:
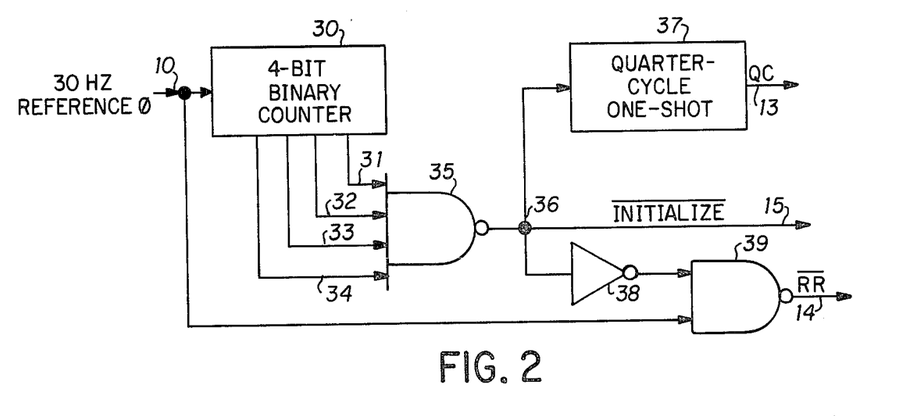
FIG. 2 is a functional diagram of the cycle timing waveform generator of FIG. 1.
Figure 3:
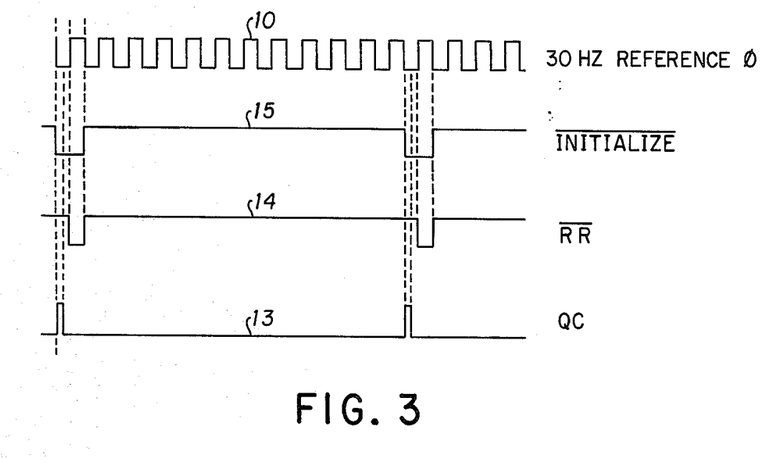
FIG. 3 depicts operational waveforms of the waveform generator of FIG. 2.

FIG. 2 illustrates an embodiment of cycle timing waveform generator 12. The 30-Hz reference input signal 10 is applied to a four-bit binary counter 30. Counter 30 thus has a counter capability of 16 and is conveniently utilized to establish the initialization cycle and 15 successive count cycles upon which the timing of the converter is based. Counter 30 accumulates a binary count in response to 15 successive zero-crossings of the 30-Hz reference phase input signal 10. Upon the sixteenth cycle being received, counter 30 has accumulated its full count, whereupon the counter stage outputs 31, 32, 33 and 34 are all binary 1. These outputs, when applied as respective inputs to NAND gate 35, develop a binary 0 output on line 36. This output 36 from NAND gate 35 comprises the $\overline{\text{INITIALIZE}}$ timing waveform 15 as depicted in FIG. 3. FIG. 3 illustrates the 30-Hz reference phase input 10 as applied to the four-bit binary counter 30 and its time relationship with the $\overline{\text{INITIALIZE}}$ pulse 15. The $\overline{\text{INITIALIZE}}$ waveform is binary 0 during one cycle period of the 30 -Hz reference phase input 10 to the counter and occurs upon successive sixteenth zero-crossings of the 30-Hz reference input 10.

With further reference to FIG. 2 the output 36 from NAND gate 35 is applied to a quarter-cycle one-shot 37 which generates an output pulse 13, designated QC, of 8.333 millisecond duration, corresponding to one quarter-cycle of the 30-Hz reference waveform, and thus occurring during the first quarter-cycle of the $\overline{\text{INITIALIZE}}$ pulse 15.

The reset pulse, by means of which the entire count operation is readied for a repeat operation, is also generated during the time duration of the $\overline{\text{INITIALIZE}}$ pulse by applying the output 36 of NAND gate 35 through an inverter 38 as an input to NAND gate 39. The second input to NAND gate 39 comprises the 30-Hz reference input waveform 10. The output 14 from NAND gate 39, designated $\overline{\text{RR}}$, comprises the reset pulse depicted in FIG. 3 and is of a time duration corresponding to the second half to the $\overline{\text{INITIALIZE}}$ pulse 15. The three pulse trains 13, 14 and 15 depicted in FIG. 3 comprise the basic timing waveforms for the operational sequence of the converter. For the embodiment to be described, wherein fifteen count samples are to be averaged, the waveforms establish a time period corresponding to 15 cycles of the 30-Hz input signal 10 followed by a sixteenth pulse which defines an initialization period during which the system is readied for a repeat count sequence.

As will be further described, during each of 15 consecutive cycles of the 30-Hz input, count start and stop pulses are generated and utilized to define a clock gate with width dependent upon the phase difference between the 30-Hz reference and variable input signals 10 and 11. Further, during the initialization cycle, and thus prior to any count sample accumulation in the binary counter during an operational sequence, a mode decision is made depending upon the quadrant in which the phase difference vector falls, to effect a preset of the binary counter to either 0° or 180°. The binary counter 24 in FIG. 1 is scaled such that during each of the 15 count sample cycles defined in the operational sequence only one-fifteenth of the actual count is accumulated and averaging is effected by using 15 phase angle difference samples from 15 consecutive cycles of the input signals.

The ambiguity encountered in this method of averaging is obviated by distinct operational modes which assure that the 15 count samples are referenced to the same revolution of the reference vector.

The mode decision logic circuitry 16 of FIG. 1 resolves the averaging ambiguity for phase differences in the vicinity of 0°. As above stated, the mode decision logic circuitry, in response to phase differences between input reference and variable signals 10 and 11 between 270° and 0° and between 0° and 90°, generates a logic output which will preset the counter 24 to 180° and, in addition, generates count stop pulses which terminate the clock gate at the time occurrence of the zero cross-overs of the complement of the 30-Hz variable input 11 rather than the signal per se. Phase difference vectors falling in the other two quadrants introduce no ambiguity, whereupon the mode decision logic circuitry develops an appropriate binary output on the preset line 19 to condition the binary counter for a zero reset. This decision is made during the sixteenth (initialization) cycle of the 30 CPS reference phase input signal and is not changed until after a full 15 samples have been accumulated.

Figure 4:
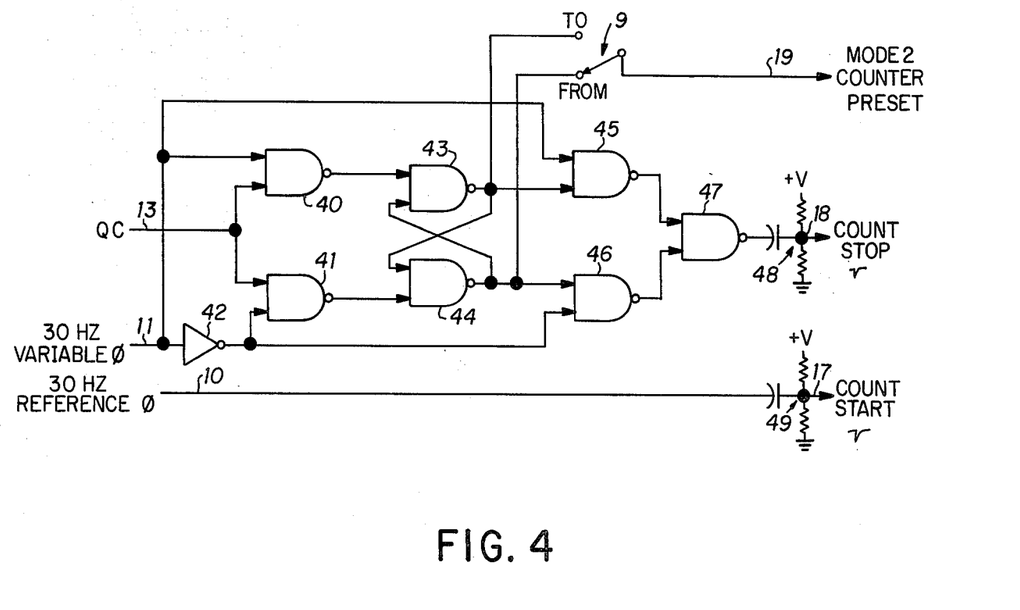
FIG. 4 is a functional diagram of count mode decisional logic circuitry as might be employed in the FIG. 1 embodiment.

A type of mode decision logic circuitry to accomplish the afore-defined objectives is depicted functionally in FIG. 4. For convenience of description, FIG. 4 includes the development of a count start pulse 17 from successive negative-going zero crossings of the 30-Hz reference input waveform 10. The development of the count start pulse is thus not an operational part of the mode decision, since the mode decision function resides, along with the development of appropriate counter preset logic, in the determination of whether the negative going zero crossings of the 30-Hz variable input waveform 11 are utilized to determine the count stop pulse or whether the complement of this waveform is so utilized.

With reference to FIG. 4 the 30-Hz reference phase input signal 10 may be applied to a differentiating network 49 to develop negativegoing count start pulses 17 in response to each successive one of the negative going zero-crossings of the 30-Hz reference waveform 10.

The mode decision circuitry is depicted in the uppermost portion of FIG. 4. The mode decision is made at the time occurrence of the trailing edge of the quarter cycle (QC) pulse 13. The logic circuitry of FIG. 4 determines, from the phase relationship between the QC pulse and the 30-Hz variable phase signal 11, the semicircle in which the phase difference vector (between the 30-Hz input signals) lies.

More specifically, the mode decision resides in logic "NAND" gates 43 and 44, which are cross-coupled to form a set/reset flip-flop operational circuit. In the conventional manner of controlling the inputs to said flip-flop operational circuit, NAND gates 40 and 41 maintain logic 1 signals into the flip-flop input terminals whenever the QC input 13 is a logic zero, thus maintaining the previously set state of said flip-flop. However, when the QC input signal is a logic one, then NAND gates 40 and 41 transfer the state of the 30-Hz variable phase input signal 11 into the above described flip-flop operational circuit. This operation is perhaps best understood by examining the two possible sets of logic states which can occur when QC input 13 is a logic one. In the first condition, the 30-Hz variable phase input 11 is defined to be a logic one, and it therefore follows that the output of NAND gate 40 is a logic zero, since both inputs to said NAND gate are logic ones. It also follows that, through the action of logic inverter 42, the complemented 30-Hz variable phase signal applied to NAND gate 41 is logic zero, and therefore the output from NAND gate 41 must be a logic one. The effect of these signals upon the flip-flop operational circuit is as follows: since NAND gate 43 has a logic zero input from NAND gate 40, its output is a logic one. Further, since the inputs to NAND gate 44 from NAND gates 41 and 43 are both logic ones, the output of NAND gate 44 is a logic zero. The above conditions of the outputs of logic gates 43 and 44 are definitive of operational mode 1.

In the second condition, the 30-Hz variable phase input 11 is defined to be a logic zero, and thus the output of NAND gate 40 is constrained to be a logic one. At the same time, through the action of inverter 42, the complement of the 30 Hz variable phase signal applied to NAND gate 41 is a logic one, and the output of NAND gate 41 will be a logic zero. The effect of these signals upon the flip-flop operational circuit will be as follows: since NAND gate 44 has a logic zero input from NAND gate 41, its output is a logic one. Further, since the inputs to NAND gate 43 from NAND gates 40 and 44 are both logic ones, the output of NAND gate 43 is a logic zero. The above conditions of the outputs of logic gates 43 and 44 are definitive of operational mode 2.

The operational mode decision making capability of the above described logic circuit resides in the fact that the flip-flop operational circuit will retain or store the last previous state of its outputs after the QC input 13 returns to a logic zero state. Thus, the condition of the 30-Hz variable phase signal 11 determines the condition of the flip-flop operational circuit up until the last possible instant before the QC input 13 falls to logic zero, and thereafter the condition of the flip-flop will correspond to the state that the 30-Hz variable signal 11 possessed at that instant, and will remain so until the QC signal 13 again rises to a logic one at the beginning of the next S + 1 initialization cycle.

In general, it may have been shown that the decision circuitry of FIG. 4 effects mode 2 when the phase difference vector is less than $(0 + n)$ degrees or greater than $(180 + n)$ degrees where $n$ is a variable defined by the width of the QC pulse; conversely, mode 1 is effected when the phase difference vector is greater than $(0 + n)$ degrees and less than $(180 + n)$ degrees. To avoid ambiguity, only those phase difference vectors lying in the area less than $(0 + x)$ degrees and greater than $(360 - x)$ degrees need effect a mode 2 decision. Thus $n$ (and, correspondingly the width of the QC pulse) need only be in excess of the maximum discrepancy $(x)$ from input signal actual phase relationships expected to be incurred during an initiation cycle determination, with a maximum value of $n$ limited by $(180 - x)$ degrees.

It is contemplated, therefore, that appropriate logic circuitry other than that of FIG. 4 might alternatively be employed to effect mode 2 operation for phase difference vectors greater than $(360 - n)$ degrees or less than $(0 + n)$ degrees.

Thus, the 30-Hz variable phase input signal 11 and the quartercycle pulse 13 are applied to appropriate logic circuitry to make a determination as to whether the above defined operational mode 1 or 2 is to be effected during the following count accumulation sequence.

The specific mode decision logic circuitry embodiment of FIG. 4, in response to inputs 13 and 11, thus generates a count stop pulse 18 corresponding to the zero-crossing of the 30-Hz variable phase input signal during the initialization period when the relative phase relationship between the 30-Hz variable and reference inputs defines a phase difference vector in the two quadrants between 90° and 270°, and provides an output 19 during the initialization period to condition the counter for a zero reset. This defines mode 1 operation.

Conversely, when the reference and variable input signals define a phase difference vector lying in the quadrant 270–360 and 0–90, respectively, the logic circuitry of FIG. 4 generates a count stop pulse 18 at the zero crossing of the complement of the 30-Hz variable phase input signal 11, while providing a counter preset output 19 of appropriate logic level to condition the counter for a 180° reset. This defines mode 2 operation.

The bearing readout may be selectively chosen as bearing TO or bearing FROM the station. As described, the counter start and stop pulses effect a bearing FROM readout. The reciprocal bearing (bearing TO) is readily attainable by changing the readout by 180°, i.e., either adding 180° to or subtracting 180° from the FROM reading. The decision circuitry of FIG. 4 is readily adaptable for this function. The reciprocal bearing may be read out by selecting inverse logic for application to the 180° preset line 19 as illustrated by switch means 9. Alternatively, selective inversion of the preset logic on line 19 might be accomplished by switch means in conjunction with for example, an inclusive OR gate in this line. Further, either the 30 CPS reference input 10 or the 30 CPS variable inputs 11 might be selectively inverted, as might the output from NAND gate 47.

Figure 5:
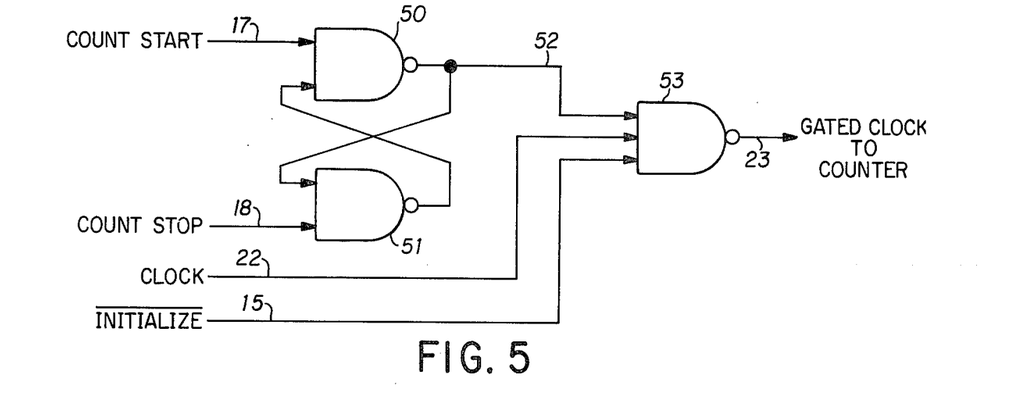
FIG. 5 is a functional diagram out of counter gate logic circuitry as employed in the system of FIG. 1.

The clock gate circuitry 20 of FIG. 1 may be embodied as shown in FIG. 5. The count gate circuitry receives the count start and stop input pulses from the mode decision circuitry of FIG. 4, along with the clock input 22 and the $\overline{\text{INITIALIZE}}$ input 15. in general operation a clock gate is generated with width defined by the respective time occurrences of the count start and count stop pulses 17 and 18. Clock pulses 22 are gated to the binary counter during this period of time for each of 15 sample periods. During the initialization period, the $\overline{\text{INITIALIZE}}$ pulse 15 inhibits the application of clock pulses to the counter. The count start and count stop pulses are applied as respective first inputs to each of two NAND gates 50 and 51. NAND gates 50 and 51 are connected to function as a set-reset flip-flop and the output 52 from NAND gate 50 thus comprises a count gate initiated at the time occurrence of a count start pulse 17 and terminated at the time occurrence of a count stop pulse 18. Clock pulses 22 are applied through NAND gate 53 (in the absence of the inhibiting $\overline{\text{INITIALIZE}}$ pulse 15) to output line 23. The number of clock pulses applied to and accumulated in clock 24 of FIG. 1 is thus related to the width of the count gate 52 which in turn is definitive of the phase angle difference between the 30-Hz reference phase and variable phase inputs 10 and 11 to the converter.

Figure 6:
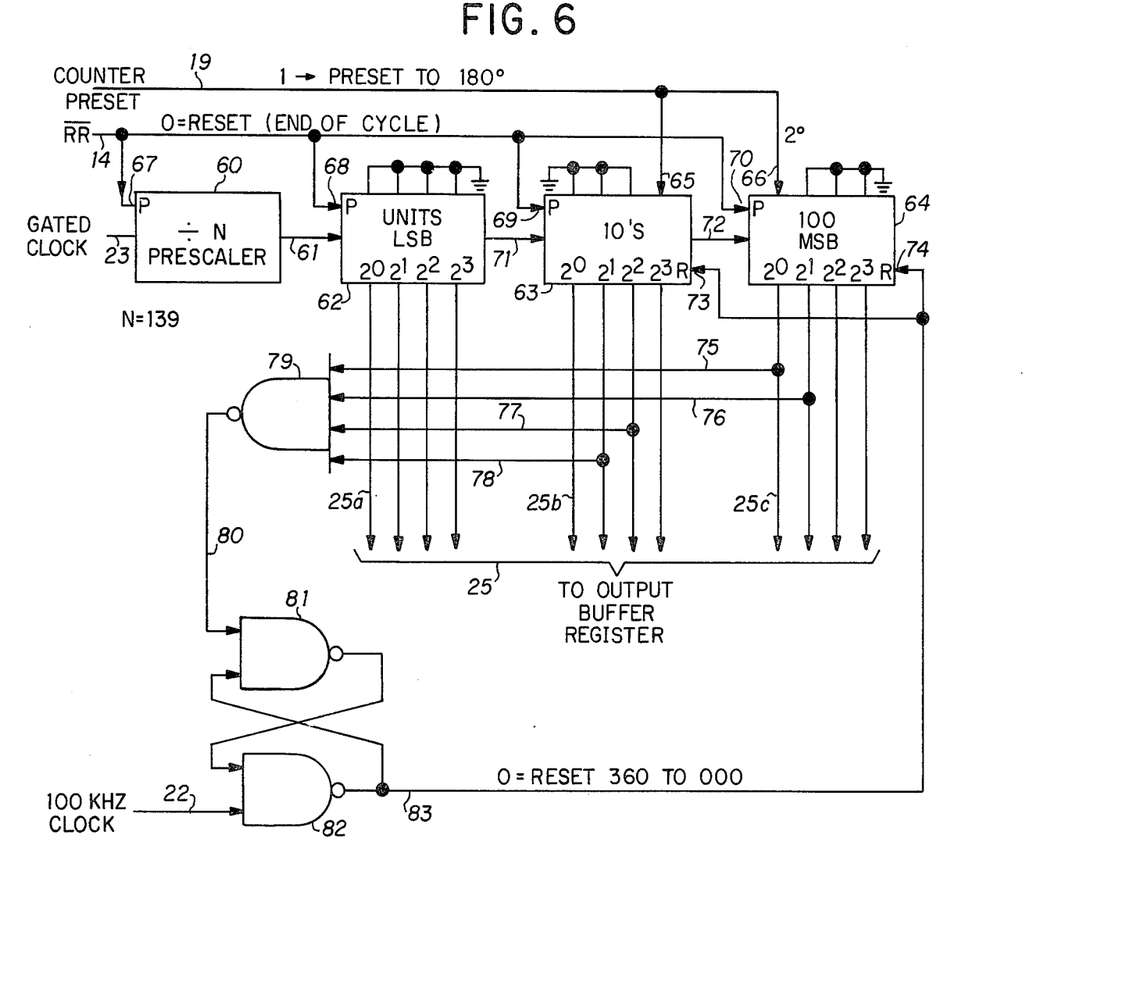
FIG. 6 is a functional diagram of a prescaled binary counter which might be employed in the FIG. 1 embodiment.

An embodiment of the prescaled binary counter 24 of FIG. 1 is depicted functionally in FIG. 6. Inputs comprise the mode preset logic on line 19 as developed in the mode decision circuitry of FIG. 4, the reset pulse 14 as generated by the cycle timing waveform generator of FIG. 2, the gated clock output 23 from the clock gate circuitry of FIG. 5, and the 100 KHz clock 22.

The gated clock pulse input 23 comprises, in a complete operational sequence, 15 consecutive groups of clock pulses each corresponding to the phase angle difference between the reference and variable input waveforms. The averaging function of the converter is effected by prescaling the counter. The gated clock pulse train 23 is applied to $(a \div N)$ prescaler. In essence, the $\div N$ prescaler causes the digital counter to count one-fifteenth of the actual phase displacement for each 15 consecutive phase measurement such that, at the conclusion of the 15 samples, the full and true count is accumulated in the counter. Determination of the prescaling factor $N$ will be further described.

The output 61 from prescaler 60 is applied as input to the least significant bit one of respectively cascaded unit's counter 62, ten's counter 63, and hundred's counter 64. Each of the counters 62, 63 and 64 comprises a four-bit counter which overflows on a count of 10. The counters 62, 63 and 64, collectively provide a binary coded decimal output, i.e., respective hundred's, ten's, and unit's digits defining the VOR bearing. For mode 2 (and assuming bearing FROM readout selection as depicted in FIG. 4) the counter preset line 19 provides a logic 1 level to appropriate preset data terminals of the ten's and hundred's digit counters 63 and 64 to condition these counters to be reset to binary 8 and binary 1, respectively at the time occurrence of the $\overline{\text{RR}}$ reset pulse 14, the latter being applied to preset terminals 67, 68, 69 and 70 of the prescaler and the three counter stages, respectively. For mode 1, the preset line provides logic zero. For bearing TO readout selection, the logic levels on line 19 are inverted.

The counter preset line 19 need only be applied to certain bits of the ten's and hundred's counters since the unit's digit counter 62 will always be reset to zero. Zero reset is accomplished by grounding all preset input terminals of counter 62. Reset to the ten's digit 8 is accomplished in the ten's digit counter 63 by tying the counter preset line to the most significant bit preset terminal and grounding the less significant bit preset terminals. The preset of the hundred's digit counter 64 to the digit 1 is accomplished by tying the counter preset line 19 to the least significant bit preset terminal of counter 64 and grounding all more significant bit preset terminals.

In conventional fashion, overflow 71 from the least significant bit counter section 62 is applied as input to the ten's digit section while the overflow 72 from the ten's counter is applied as input to the hundred's digit counter. Output line groups 25a from counter 62, 25b from counter 63 and 25c from counter 64, collectively comprise the output 25 applied to output buffer register 26 of the FIG. 1.

Since the operation necessitates an unconditional reset of the counter to 000 whenever a count accumulation of 360 reached, logic circuitry responsive to the 100 KHz clock 22 and a count of 360 is used to effect such a reset. When the digit 3 is accumulated in the hundred's digit counter 64, the two least significant bit outputs from counter 64 comprise binary 1's. These outputs are applied as inputs 75 and 76 to a NAND gate 79. When the digit 6 is accumulated in the ten's digit counter 63, the two middle weighted bit outputs are binary 1's and these outputs are applied as inputs 77 and 78 to NAND gate 79. NAND gate 79 thus produces at a count accumulation of 360 a transition from binary 1 to binary 0 on output 80. Output 80 and the 100 KHz clock input 22 are applied as respective first inputs to NAND gates 81 and 82 which are interconnected in a set reset flip-flop operational circuit. Thus, upon 360 being accumulated in the counter, NAND gate 79 produces a binary 0 output which causes the output 83 from NAND gate 82 to exhibit a binary 0 which is utilized to effect an unconditional reset of the hundred's and ten's digit counters by application to appropriate input terminals 74 and 73, respectively. This unconditional reset function implies that these counters are reset at this instant to zero regardless of any preset conditions imposed. Thus, when the total count accumulated in any count cycle reaches 360, the counter is immediately reset to 000 before the next clock pulse occurs. This effectively subtracts 360° from the BCD reading collectively defined by the counter output stages for angular counts exceeding one revolution of the phase difference vector, and the output is therefore always less than 360°.

Prescaling has been briefly described as dividing the gated clock input to the counter by a predetermined factor of $N$ prior to application to the counter. The prescaling factor $N$ may be determined as follows.

In general $$N = \frac{mrS}{360f}$$

in terms of clock pulses per counter pulse, where $m$ is the number of degrees desired per counter pulse at the output of the prescaler 60, $r$ is the clock pulse repetition rate in pulses per second, $S$ is the number of count samples to be averaged, and $f$ is the frequency of the reference and variable phase input signals 10 and 11 to the converter.

For the particular embodiment described herein, N comprised the digit 139, arrived at in accordance with the generalized abovedefined relationship as follows:

The phase rate of the input 30-Hz signals is equal to 360 degrees divided by one-thirtieth second, or 10,800 degres per second.

The average weighted phase rate equals 10,800 divided by 15 (samples), or 720 degrees per second.

The input clock equals 100,000 pulses per second.

The clock pulse weight equals 720 degrees divided by 100,000 or 0.0072 degrees per clock pulse.

At the output of the prescaler one counter pulse equals 1 degree.

N equals 1 degree per counter pulse divided by 0.0072 degrees per clock pulse equals 138.888 clock pulses per counter pulse.

Therefore N is approximately equal to 139 (the nearest integer dividing factor).

Examination of the above determination of N indicates that considerable design leeway is afforded in that the necessary division factor to be incorporated in the ÷N prescaler is a direct function of the clock repetition rate and number of samples to be averaged and an inverse function of the input signal frequency. Thus, one might utilize the same division factor in a system doubling the clock repetition rate and halving the number of cycles to be averaged or vice versa, and still accomplish the averaging function of the invention. Further, should one desire the readout to be to the nearest 0.5 degrees and employ a further BDC counter stage, at the output of the prescaler 60 one counter pulse would be assigned a value of 0.5° ($m = 0.5$) and the scaling factor employed in accordance with the above-defined determination, would be halved.

Figure 7:
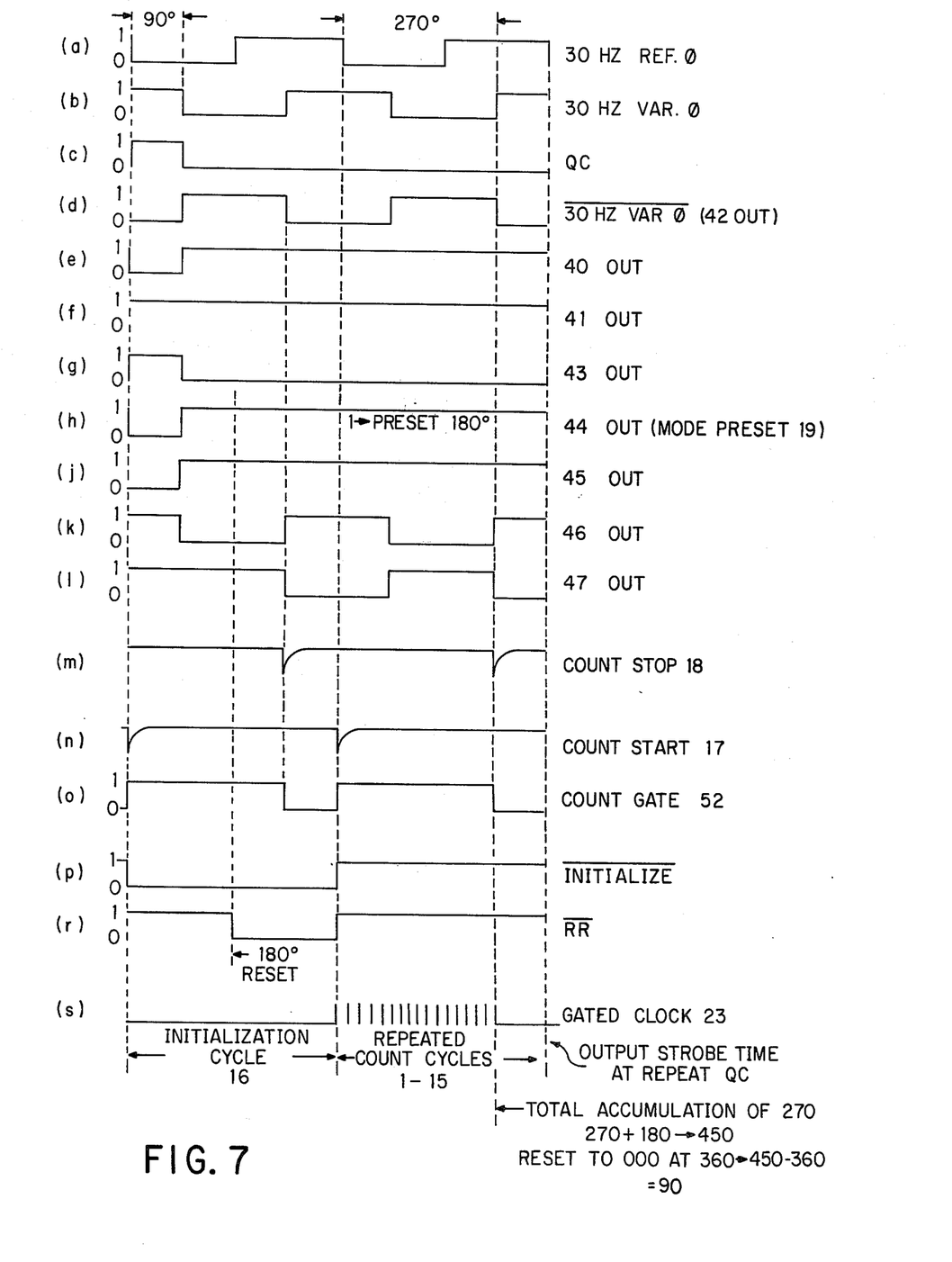
FIG. 7 depicts operational waveforms illustrating the development of digital outputs indicative of VOR bearing as carried by an exampled phase difference between reference and variable input analog waveforms.
Figure 8:
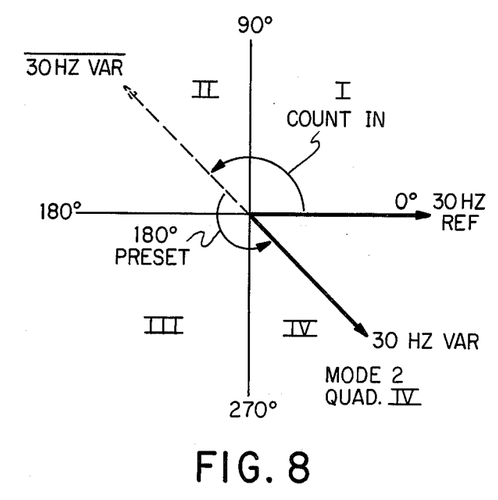
FIGS. 8–11 diagramatically illustrate the operational mode counting technique employed.
Figure 9:
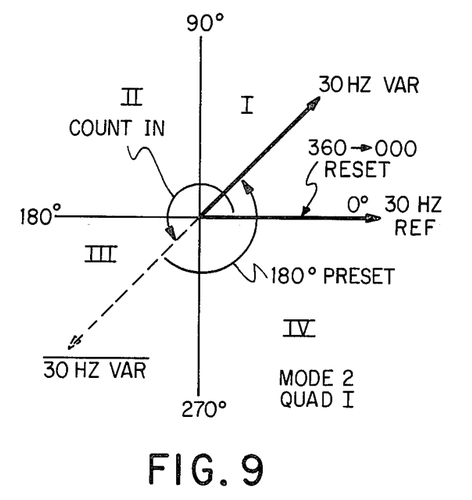
Figure 10:
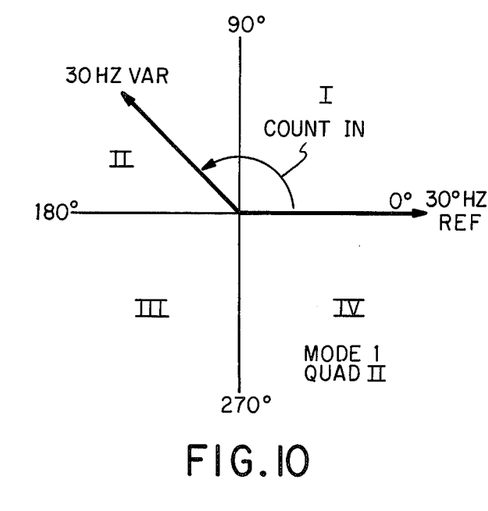
Figure 11:
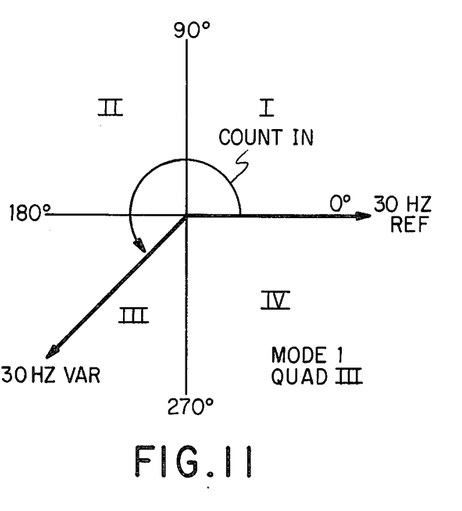

The manner in which the converter develops a readout for an exampled 90° bearing (implying 90° phase difference between the 30-Hz reference and variable input signals) is depicted by the operational waveforms of FIG. 7. Since the 90° bearing defines mode 2 operation, and results in the count accumulation exceeding 360, this example is chosen to most fully describe the operation of the converter.

With reference to FIG. 7 operational waveforms are depicted for a phase difference vector between the 30 Hz reference and variable input signals lying in the quadrant 0° – 90°. For convenience of representation the vector has been chosen as 90°. For any phase differences between 0° and 90°, the total count accumulated in the counter is the sampled accumulation plus the 180° preset count and thus the total accumulated count in this quadrant lies between 360° for 0° actual and 450° for 90° actual.

Two of the 16 timing cycles which collectively define a complete operational sequence are illustrated. The first of the depicted timing cycles is the sixteenth, or initiation, cycle and the second depicted cycle is typical of the first and succeeding ones of the 15 count cycles which follow the initialization time frame.

Waveforms ($a$) and ($b$) of FIG. 7 represent the 30-Hz reference phase input signal 10 and the 30-Hz variable phase input signal 11. A 90° relationship exists with the variable phase signal lagging the reference.

Waveform ($c$) illustrates the quarter-cycle timing waveform developed in the cycle timing waveform generator 12 and its time relationship with the reference waveform ($a$). Waveform ($d$) illustrates the complement of the 30-Hz variable cycle which is developed in inverter 42 of the mode decision logic circuitry of FIG. 4.

The depicted waveforms ($e$) – ($n$) illustrate the logic waveforms developed in the mode decision logic circuitry of FIG. 4 in response to the QC input 13, the 30-Hz variable phase signal input 11 and 30-Hz reference phase signal input 10.

Reference is made to waveform ($h$) which comprises the mode preset output 19 which is applied to the counter of FIG. 6 to condition the preset inputs of appropriate stages for an initial reset count of 180°. Waveform ($h$) goes to binary 1 at the trailing edge of the QC waveform. The mode decision made by the circuitry of FIG. 4 occurs at the trailing edge of the QC waveform and will either be binary 1 or binary 0 depending upon the mode defined by the phase difference vector. This decision (binary level) is retained through the successive 15 sample count accumulation.

Waveform ($m$) shows the count stop pulse occurring at the fall of the complement of the 30-Hz variable signal [waveform ($d$)]. The count start pulse 17, depicted in waveform ($n$) always occurs at the fall of the 30-Hz reference phase waveform ($a$).

Development of the gated clock pulse train applied to the counter during a typical one of each of the fifteen successive count cycles following the initialization cycle is depicted in waveforms ($o$), ($p$), ($r$), and ($s$), as developed by the clock gate circuitry of FIG. 5.

Waveform ($o$) is the count gate. The leading edge of the count gate 52 is defined by a count start pulse 17 while the trailing edge is defined by the count stop pulse 18. Again it should be noted that the count stop pulse for the depicted operation in the quadrant defined by phase differences 0°– 90° is determined by the trailing edge or fall of the complement of the 30-Hz variable phase signal and that this is effected by a mode 2 decision in the circuitry of FIG. 4 when the mode preset output 19 from the circuitry [waveform ($h$)] effects a reset of the counter to 180° during the initialization cycle.

Waveform ($p$), the $\overline{\text{INITIALIZE}}$ waveform inhibits the count gate of FIG. 5 [waveform ($o$)] during the initialization cycle. Waveform ($r$), the RR (reset) pulse is seen to fall at the half-point of the $\overline{\text{INITALIZE}}$ waveform ($p$) and at this point the preset logic of waveform ($h$) effects a reset of the counter (prior to count cycle 1) of 180°. Waveform ($s$) illustrates the passing of clock pulses through NAND gate 53 of FIG. 5 on line 23 to the prescaled binary counter of FIG. 6.

The number of clock pulses gated into the counter during each of the 15 cycles corresponds to one-fifteenth of the actual phase difference. Thus, in 15 count cycles a total of 270 clock pulses are entered into the counter which, added to the 180° preset, defines a total accumulation of 450°. However, the counter is not allowed to count past 360 and is reset to 000 immediately upon the count of 360 being accumulated therein. The counter, at the conclusion of 15 samples, corresponds to the actual phase difference vector of 90°.

Further reference to FIG. 7 illustrates that the counter output is strobed at the beginning of the initialization cycle while a mode decision for an ensuing count sequence is made at the termination of the quarter-cycle waveform and the counter is reset to zero or 180, depending upon the mode decision, prior to the first of the 15 sequential sample periods.

Although not particularly illustrated by waveform analysis, it can be shown that the count stop pulse 18 is generated at the fall of the 30-Hz variable signal complement for any phase difference vectors lying between the 270° and 0° and 90°, while the count stop pulse 18 occurs time-wise at the fall of the 30-Hz variable phase signal per se for phase difference vectors lying between 90°– 180° and 180°– 270°. Reference is made to mode operational diagrams of FIGS. 8–11. When the complement of the 30-Hz variable phase signal determines the count stop pulse position, the counter will always accumulate 180° more than it needs for a final accumulation corresponding to the actual phase difference vector. However, in these instances (mode 2 operation) a 180° preset in the counter, along with a reset to 000 upon 360 being accumulated, results in an accumulated count at readout time which correlates to the actual phase difference vector.

The present invention is thus seen to provide a novel converter circuitry whereby the phase difference between a pair of input waves is converted to a directly readable binary output indication. The averaging method employed assures validity of readout which is effected at the conclusion of the averaging function. The conversion method offers flexibility in that the averaging may be refined by increasing the number of cycles to be averaged within the design restraints imposed by feasible clock rates and circuit response times. For example, 31 samples might be employed rather than the exampled 15 and a 5-bit counter employed in the cycle waveform generator of FIG. 2 to add one more increment of filtering. This, of course, infers a corresponding appropriate change in the prescale division factor of N whereupon one-thirty-first of the actual count will be entered into the counter for each of the 31 successive samples. It is further obvious that a binary output other than BCD may be obtainable by utilizing other than a BCD counter to accumulate clock pulses.

Thus, although the present invention has been defined with respect to a particular embodiment thereof it is not to be so limited, as changes might be made therein that fall within the scope of the invention as defined in the appended claims.

Wherein I claim:

1. In a converter circuitry of the type developing a binary readout of the phase displacement angle between first and second coherent frequency signals by developing a gating waveform the width of which is proportional to said phase displacement angle and gating a clock source into a binary counter in accordance with this gate width to effect a count accumulation in said counter corresponding to said phase displacement angle;

the method for developing a count accumulation in said counter which is the time average of a plurality of sampled accumulations comprising the steps of:
scaling said counter to accumulate during each of a plurality of $S$ cycles of said first signal a count corresponding to $1/S$ times the count actually definitive of an existing phase angle between said input signals, strobing the output of said counter to output utilization means during the ensuing cycle ($S + 1$) period, logically defining during said ($S + 1$) time period, in response to the then existing phase displacement angle between said first and second signals, a first operational mode for phase displacements in excess of zero by $n$ degrees and less than 360 by at least $n$ degrees, where $n$ is a continuing variable and a second operational mode for displacements other than the above-defined first operational mode displacements, presetting said counter during said ($S + 1$) time period to effect a reset thereof to zero in response to said first mode definition, and presettng said counter during said ($S + 1$) time period to effect a reset thereof to binary 180 in response to said second mode definition while utilizing the relative phase of the complement of said second input signal in defining said clock gate width for the ensuing sequence of $S$ accumulation periods.

2. The method of claim 1 further comprising the steps of unconditionally resetting said counter to zero upon a gated clock pulse input thereto effecting a count accumulation therein of a binary 360 and prior to the timing occurrence of the next succeeding one of said clock pulses.

3. The method of claim 2 wherein said first mode phase displacements are less than ($180 + n$) degrees.

4. The method of claim 3 wherein the variable n is approximately equal to and less than 90.

5. The method of claim 3 further comprising the step of selectively effecting by logic inversion means a count accumulation during either of said first and second operational modes which differs by 180 from that normally accumulated.

6. The method of developing a binary readout corresponding to the average phase relationship between a reference phase and variable phase input signal over a predetermined period of time comprising the steps of:
accumulating clock pulses in a binary counter during a plurality of $S$ sample time intervals with each accumulation being $1/S$ of a total accumulation which correspond to the relative phase between said reference and variable phase input signals, scaling said counter to count $1/S$ times the actual number of clock impules corresponding to the phase relationship to be defined, defining a readout and initialization time period following said $S$ sample time periods, effecting during said initialization period a reset of said counter to zero when the phase relationship between said reference and variable phase input signals defines a phase difference in excess of zero by $n$ degrees and less than 360 by at least $n$ degrees to define a first operational mode, effecting during said initialization period a reset of said counter to a count corresponding to 180° when the phase relationship between said reference and variable phase signals defines a phase difference other than the above-defined first operational mode differences to define a second operational mode, where $n$ is a continuous variable, utilizing in the ensuing sequence of $S$ sample period the variable phase input signal to define the phase relationship between said input signals during the said mode 1 operation and the complement of the variable phase input signal to define the phase difference between said input signals during mode 2 operation, and effecting an unconditional reset of said counter to zero upon the count therein accumulating to a binary number equivalent to 360°.

7. The method of claim 6 wherein said first mode phase differences are less than ($180 + n$) degrees.

8. The method of claim 7 further comprising the step of selectively effecting by logic inversion means a count accumulation during either of said first and second operational modes which differs by 180 from that normally accumulated.

9. Means of accumulating a binary number in a digital counter corresponding to the phase angle between coherent frequency reference phase and variable phase input signals comprising, a source of clock pulses, clock pulse gating means, timing generator means establishing a repetitive sequence of ($S + 1$) time intervals the time duration of which is defined as one cycle of said input waveforms, said clock pulse gating means being responsive to a like reference point on said reference and variable waveforms to gate said clock pulses to said counter for a gating time interval during $S$ successive cycles of said input waveforms, said gating time intervals beng proportional to the existing phase relationship between said reference and variable input signals;

logic means receiving said reference and variable input signals and a control signal time synchronous with successive $(S + 1)$ ones of said time intervals to develop a first logic level output for reference and variable signal phase differences during that interval in excess of zero by $n$ degrees and less than 360 by at least n degrees to define a first operational mode, and to develop a second logic level output for reference and variable signal phase differences other than the above-defined first operational mode differences to define a second operational mode, where $n$ is a continuous variable; means for prescaling said binary counter to count $1/S$ of that count corresponding to the difference vector, control means responsive to said mode logic means logic level outputs to preset said counter to 180° upon said mode 2 definition being effected and to preset said counter to zero upon said mode 1 definition being effected, said clock pulse generating means being responsive to said mode logic means to develop said clock gating waveform in proportion to the phase difference vector between said reference phase input signal and the complement of said variable phase input signal for the ensuing $S$ time intervals following said mode 2 definition, and means responsive to a count corresponding to 360° being accumulated in said counter to reset said counter to zero prior to the time occurrence of the next successive one of said clock pulses.

10. Means as defined in claim 9 wherein said first mode phase differences are less than $(180 + n)$ degrees.

11. Means as defined in claim 10 further comprising selective logic inversion means for effecting a count accumulation during either of said first and second operational modes which differs by 180 from that normally accumulated.

12. Means as defined in claim 9 wherein said means for prescaling said counter comprises a binary dividing means to which said gated clock pulses are applied and from which clock pulses are applied to said counter, said divider dividing by a factor of $N = mrS/360f$, where $m$ is a scaling factor in terms of number of counter pulses per phase angle degree at the output of said divider, $r$ is the repetition rate of said clock pulses in pulses per second, $S$ is the number of clock sample periods, and $f$ is the frequency of said input reference and variable signals in cycles per second.

13. Means as defined in claim 12 wherein said timing generating means comprises a binary counter of $x$-bit resolution such that $2^x = S + 1$, said $x$-bit binary counter receiving said reference phase input signal and counting successive cycles thereof, and further logic means responsive to the $(S + 1)$ ones of said reference signal cycles to inhibit said clock pulse gate for the duration of that cycle and sequentially during that cycle to effect readout of said output counter, and effect said mode decision with corresponding output counter preset for an ensuing S ones of said input signal cycles.

14. Means as defined in claim 13 further comprising an output register receiving the output of said counter, and means for strobing the output of said register to an output utilization means.

15. Means as defined in claim 14 wherein said first mode phase differences are less than $(180 + n)$ degrees.

16. Means as defined in claim 15 wherein the variable $n$ is approximately equal to and less than 90.

17. Means as defined in claim 15 further comprising selective logic inversion means for effecting a count accumulation during either of said first and second operational modes which differs by 180 form that normally accumulated.

* * * * *